United States Patent
Amador et al.

(10) Patent No.: US 9,695,870 B2
(45) Date of Patent: Jul. 4, 2017

(54) TURBOMACHINE BEARING SUPPORT STRUCTURE

(71) Applicant: United Technologies Corporation, Hartford, CT (US)

(72) Inventors: Armando Amador, Wethersfield, CT (US); Sean McCutchan, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 43 days.

(21) Appl. No.: 14/427,760

(22) PCT Filed: Jan. 18, 2013

(86) PCT No.: PCT/US2013/022011
§ 371 (c)(1),
(2) Date: Mar. 12, 2015

(87) PCT Pub. No.: WO2014/051657
PCT Pub. Date: Apr. 3, 2014

(65) Prior Publication Data
US 2015/0240867 A1 Aug. 27, 2015

Related U.S. Application Data

(60) Provisional application No. 61/705,208, filed on Sep. 25, 2012.

(51) Int. Cl.
*F16C 27/04* (2006.01)
*F01D 25/16* (2006.01)
(Continued)

(52) U.S. Cl.
CPC ............ *F16C 27/00* (2013.01); *F01D 25/164* (2013.01); *F16C 27/04* (2013.01); *F16C 27/045* (2013.01); *F16C 19/06* (2013.01); *F16C 2360/23* (2013.01)

(58) Field of Classification Search
CPC ........ F01D 25/164; F16C 27/00; F16C 27/04; F16C 19/06; F16C 2360/23
See application file for complete search history.

(56) References Cited

U.S. PATENT DOCUMENTS 3,205,024 A * 9/1965 Morley ................. F01D 25/164
384/582
4,084,861 A * 4/1978 Greenberg ............ F01D 25/164
384/105
(Continued)

FOREIGN PATENT DOCUMENTS

EP 1808580 7/2007
EP 2479406 7/2012

OTHER PUBLICATIONS

International Preliminary Report on Patentability for International Application No. PCT/US2013/022011 mailed Apr. 9, 2015.
(Continued)

*Primary Examiner* — Alan B Waits
(74) *Attorney, Agent, or Firm* — Carlson, Gaskey & Olds, P.C.

(57) ABSTRACT

A centering spring assembly of a turbomachine according to an exemplary aspect of the present disclosure includes, among other things, a damper beam, a bearing support, and a spanner nut. At least a portion of the damper beam axially overlaps at least a portion of the spanner nut relative to a rotational axis of the turbomachine.

16 Claims, 3 Drawing Sheets

(51) Int. Cl.
*F16C 27/00* (2006.01)
*F16C 19/06* (2006.01)

(56) References Cited

U.S. PATENT DOCUMENTS

| | | | | |
|---|---|---|---|---|
| 4,214,796 A * | 7/1980 | Monzel | ............... | F01D 25/164 384/202 |
| 4,429,923 A * | 2/1984 | White | ............... | F16C 27/045 384/99 |
| 4,451,110 A * | 5/1984 | Forestier | ............... | F01D 25/164 384/582 |
| 4,971,457 A * | 11/1990 | Carlson | ............... | F01D 25/164 384/581 |
| 5,088,840 A * | 2/1992 | Radtke | ............... | F16C 27/045 384/535 |
| 5,110,257 A * | 5/1992 | Hibner | ............... | F01D 25/164 415/119 |
| 5,183,342 A * | 2/1993 | Daiber | ............... | F01D 25/18 384/462 |
| 6,540,483 B2 * | 4/2003 | Allmon | ............... | F01D 25/16 384/581 |
| 6,682,219 B2 * | 1/2004 | Alam | ............... | F01D 25/164 384/581 |
| 6,695,478 B2 * | 2/2004 | Bos | ............... | F01D 25/164 384/99 |
| 6,783,319 B2 * | 8/2004 | Doerflein | ............... | F01D 21/045 384/495 |
| 6,910,863 B2 * | 6/2005 | Scardicchio | ............... | F16C 27/04 415/110 |
| 7,097,412 B2 | 8/2006 | DiTomasso | | |
| 7,182,519 B2 * | 2/2007 | Singh | ............... | F01D 17/02 384/448 |
| 7,384,199 B2 * | 6/2008 | Allmon | ............... | F01D 25/164 384/581 |
| 8,646,978 B2 * | 2/2014 | Jadczak | ............... | F16C 19/52 384/535 |
| 8,734,023 B2 * | 5/2014 | Ashmore | ............... | F16C 27/04 384/513 |
| 8,747,054 B2 * | 6/2014 | Witlicki | ............... | F01D 25/164 415/119 |
| 9,279,449 B2 * | 3/2016 | Rouesne | ............... | F01D 25/164 |
| 2003/0005705 A1 * | 1/2003 | Chan | ............... | F01D 25/145 60/796 |
| 2009/0034896 A1 * | 2/2009 | Fisher | ............... | F01D 25/162 384/531 |
| 2009/0148274 A1 * | 6/2009 | Kostka | ............... | F01D 25/164 415/170.1 |
| 2011/0123326 A1 | 5/2011 | DiBenedetto et al. | | |
| 2011/0286836 A1 | 11/2011 | Davis | | |
| 2012/0260669 A1 | 10/2012 | Davis et al. | | |
| 2012/0263578 A1 | 10/2012 | Davis et al. | | |
| 2013/0280063 A1 * | 10/2013 | Ganiger | ............... | F16C 19/54 415/229 |
| 2013/0294917 A1 * | 11/2013 | Alam | ............... | F01D 25/164 416/174 |
| 2015/0176427 A1 * | 6/2015 | Denis | ............... | F01D 21/045 60/779 |
| 2015/0176431 A1 * | 6/2015 | Raykowski | ............... | F16C 35/067 415/9 |
| 2015/0275978 A1 * | 10/2015 | Durling | ............... | F01D 5/025 29/525.08 |

OTHER PUBLICATIONS

International Search Report, dated May 13, 2013.
Extended European Search Report for Application No. 13842218.3 dated Jun. 7, 2016.

\* cited by examiner

TURBOMACHINE BEARING SUPPORT STRUCTURE

CROSS-REFERENCE TO RELATED APPLICATIONS

This application claims priority to U.S. Provisional Application No. 61/705,208, which was filed on 25 Sep. 2012 and is incorporated herein by reference.

BACKGROUND

This disclosure relates generally to a bearing support and, more particularly, to a bearing support for a shaft.

Turbomachines, such as gas turbine engines, typically include a fan section, a compression section, a combustion section, and a turbine section. Turbomachines may employ a geared architecture connecting portions of the compression section to the fan section.

Turbomachines include various supports. Centering springs are an example support. Centering springs provide support for bearings that then support rotors, shafts, etc. within turbomachines. Some centering springs include multiple, circumferentially distributed beam-like features. These features may be tuned to adjust the stiffness of the centering springs. Adjusting the stiffness is desirable to provide stable operation of rotating components throughout various operating speeds.

Accommodating centering springs is often difficult, especially where axial distances are constrained. Limiting the axial length of the beam-like feature reduces the tunability of the centering spring. Providing oil to bearings during an oil-interruption-event is also difficult.

SUMMARY

A centering spring assembly of a turbomachine according to an exemplary aspect of the present disclosure includes, among other things, a damper beam, a bearing support, and a spanner nut. At least a portion of the damper beam axially overlaps at least a portion of the spanner nut relative to a rotational axis of the turbomachine.

In a further non-limiting embodiment of the foregoing centering spring assembly, the damper beam is radially outside the bearing support.

In a further non-limiting embodiment of either of the foregoing centering spring assemblies, the assembly includes a radial flange directly connecting the damper beam to the bearing support.

In a further non-limiting embodiment of any of the foregoing centering spring assemblies, the radial flange is a first radial flange extending from a first end of the damper beam, and a second radial flange extends from a second end of the damper beam. The first end is opposite the second end.

In a further non-limiting embodiment of any of the foregoing centering spring assemblies, the first and second radial flange may extend from the damper beam in opposite radial directions.

In a further non-limiting embodiment of any of the foregoing centering spring assemblies, the radial flange connects to the bearing support at a first position and the radial flange connects to the damper beam at a second position downstream from the first position relative to a direction of flow through the turbomachine.

In a further non-limiting embodiment of any of the foregoing centering spring assemblies, the bearing support and the damper beam are portions of a single continuous piece.

In a further non-limiting embodiment of any of the foregoing centering spring assemblies, the assembly includes a bearing race that is radially supported by the bearing support, and axially supported by the spanner nut.

In a further non-limiting embodiment of any of the foregoing centering spring assemblies, the assembly includes a flange structure extending radially from the spanner nut toward the axis to provide a lubrication trough.

In a further non-limiting embodiment of any of the foregoing centering spring assemblies, the assembly includes an outer race of a ball bearing assembly support, the outer race supported by the bearing support.

A centering spring assembly of a turbomachine according to an exemplary aspect of the present disclosure includes, among other things, a damper beam, a bearing support, and a spanner nut having body portion a flange structure extending radially from the main body toward a rotational axis of the turbomachine to provide a lubrication trough.

In a further non-limiting embodiment of the foregoing centering spring assembly, the spanner nut is configured to directly contact an axially facing surface of a bearing race.

In a further non-limiting embodiment of either of the foregoing centering spring assemblies, at least a portion of the spanner nut axially overlaps at least a portion of the damper beam.

In a further non-limiting embodiment of any of the foregoing centering spring assemblies, the assembly includes a radial flange connecting the bearing support and the damper beam, the radial flange connect to the bearing support at a first position and to the damper beam at a second position, the first position upstream from the second position relative to a direction of flow through the turbomachine.

In a further non-limiting embodiment of any of the foregoing centering spring assemblies, the assembly includes a plurality of the damper beam distributed circumferentially about a rotation axis of the turbomachine.

A method of supporting a centering spring according to another exemplary aspect of the present disclosure includes, among other things, damping a centering spring at a position that axially overlaps a bearing support, rotatably supporting a turbine shaft with a bearing assembly, and supporting the bearing shaft with the bearing support.

In a further non-limiting embodiment of the foregoing method of supporting a centering spring, the method may include capturing lubricant from the bearing assembly or bearing compartment using a trough that is at least partially defined by a spanner nut.

In a further non-limiting embodiment of either of the foregoing methods of supporting a centering spring, a damping member that provides the damping axially may overlap at least a portion of the spanner nut.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
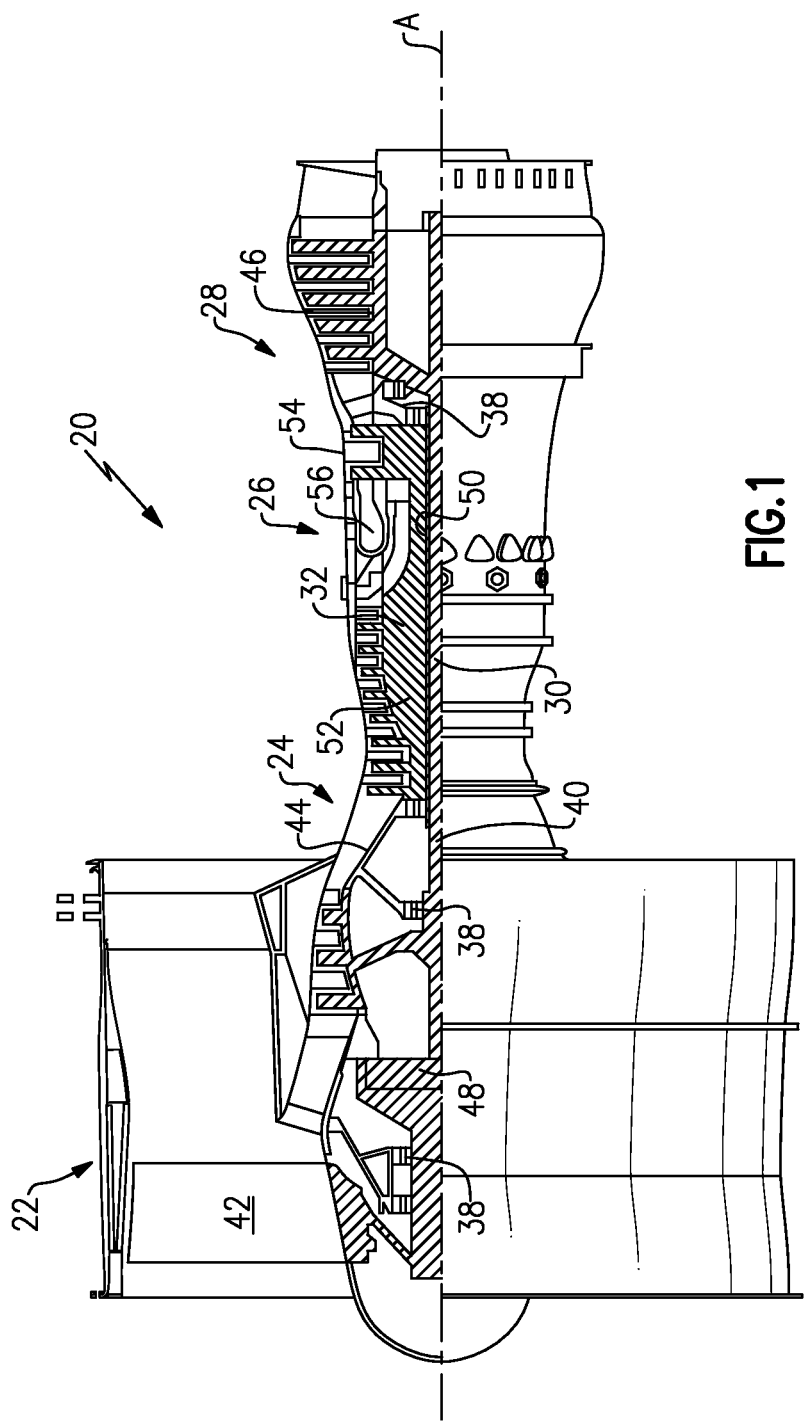
FIG. 1 shows a section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(Tram\ °\ R)/(518.7°\ R)]^{0.5}$. The Temperature represents the ambient temperature in degrees Rankine. The Low Corrected Fan Tip Speed according to one non-limiting embodiment of the example engine 20 is less than about 1150 fps (351 m/s).

Figure 2:
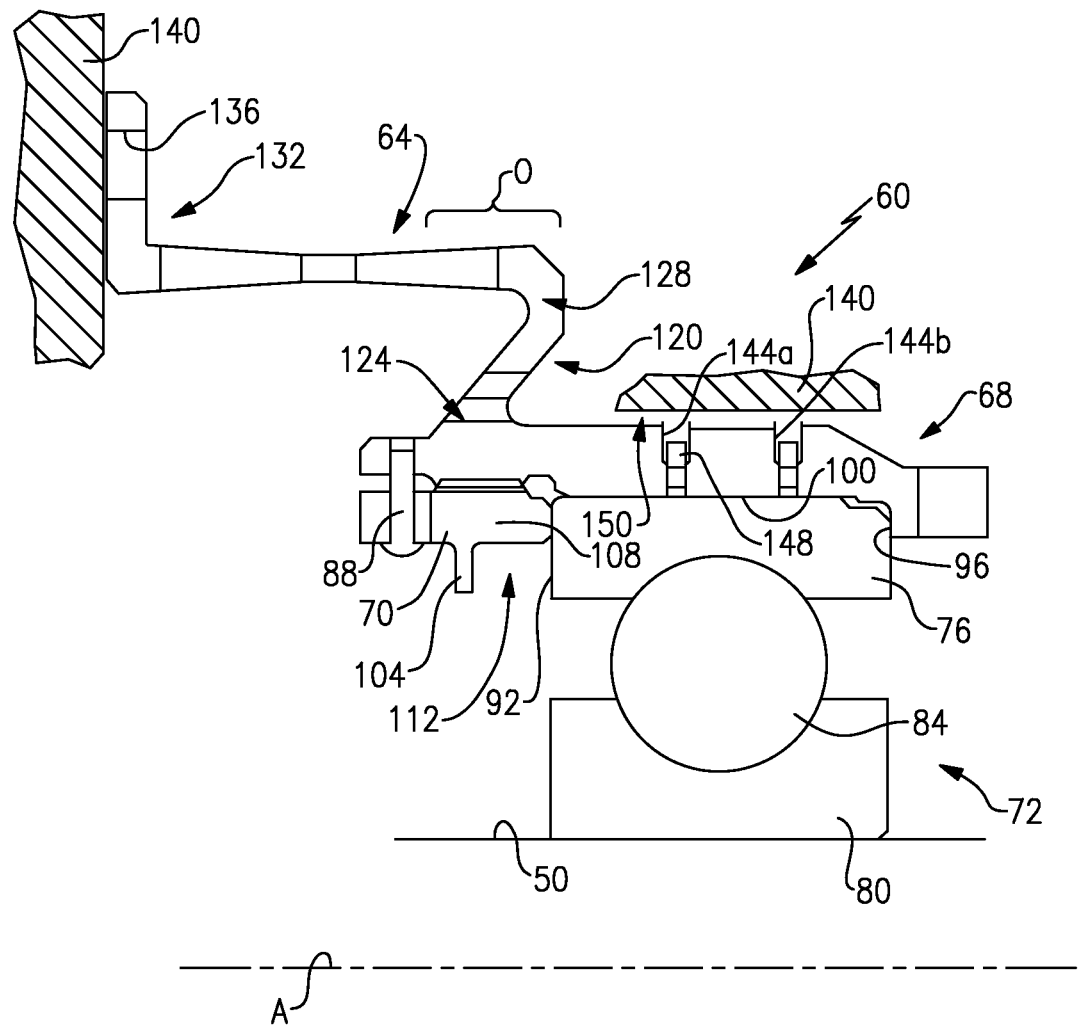
FIG. 2 show a section view of an example bearing support of the turbomachine of FIG. 1.

Referring to FIG. 2, an example centering spring assembly 60 includes a damper beam 64, a bearing support 68, and a spanner nut 70. The section view of FIG. 2 shows a single damper beam 64. In the assembly, multiple damper beams 64 are distributed circumferentially about the axis A. A bearing assembly 72 includes an outer race 76 and an inner race 80. Ball bearings 84 are contained between the outer race 76 and the inner race 80. The centering spring assembly 60 supports the bearing assembly 72, which then rotatably supports the shaft 50 of the high-speed spool 32, low-speed spool 30, or a sleeve-like component that rest radially between the inner race 80 and the shaft 50. The bearing assembly 72 may support other shafts, rotors, etc. in other examples.

In this example, the outer race 76 is directly supported by the bearing support 68 of the centering spring assembly 60. The spanner nut 70 is fastened directly to the bearing support 68 with a mechanical fastener 88. The spanner nut 70 directly contacts an axially facing surface 92 of the outer race 76. The outer race 76 is captured axially between the spanner nut 70 and a shoulder 96 of the bearing support 68. The outer race 76 is captured radially between a surface 100 of the bearing support 68 and the ball bearing 84.

Although the example bearing assembly 72 is shown as a ball bearing assembly, the bearing assembly 72 may be a roller bearing or some other type of bearing assembly in other examples.

A flange structure 104 extends radially from a main body portion 108 of the spanner nut 70 toward the rotational axis A. A trough 112 is established between the flange structure 104 and the surface 92 of the outer race 76. During operation, a lubricant, such as oil, is expelled from the bearing assembly 72 and other areas of the engine 20. The bearing assembly 72 is positioned within a bearing compartment. Other areas of the bearing compartment may additionally expel lubricant. The trough 112 traps and retains at least some of this lubricant expelled from the bearing assembly 72, the bearing compartment, etc. Windage generated by rotation of portions of the bearing assembly 72 may help retain the lubricant within the trough 112. Oil from the trough 112 may help lubricant the bearing assembly 72. Windage from the bearing assembly 72 will encourage lubricant to stay within the trough 112 even under negative g operating events.

Although this example shows the flange structure 104 extending uninterruptedly as a continuous structure from the main body portion 108 of the spanner nut 70, other examples may include a spiral retaining ring or some other structure that traps and retains at least some of the lubricant expelled from the bearing assembly 72. The spiral retaining ring can sit in a groove machined into the spanner nut 70, for example. The spiral retaining ring is a type of flange structure that is separate from the main body portion 108 of the spanner nut 70.

The example damper beam 64 is radially outside the bearing support 68. A radial flange 120 connects the bearing support 68 to the damper beam 64. In this example, the radial flange 120 connects to the bearing support 68 at a first position 124. The radial flange 120 connects to the damper beam 64 at a second position 128. The first position 124 is upstream the second position 128 relative a direction of flow through the engine 20. Since the first and second positions 124 and 128 are axially offset, the example radial flange 120 has an axial component.

In this example, at least a portion of the damper beam 64 axially overlaps at least a portion of the spanner nut 70. The axially overlapping portion is designated as radial overlap O in FIG. 2. The example centering spring assembly 60 generally has a "Z" configuration.

The radial flange 120 is located at a first axial end of the damper beam 64. At an opposite, second end of the damper beam 64 another radial flange 132 extends radially away from the rotational axis. The radial flange 132 provides an aperture 136. A fastener may be secured through the aperture 136 to connect the second radial flange 132, and thus the centering spring assembly 60, directly to a fixed structure 140 of the engine 20. In this example, the fixed structure 140 is an intermediate case of the engine 20.

The example bearing support 68 includes two apertures 144a and 144b. Piston ring seals 148 are received within the apertures 144a and 144b. In other examples, the piston ring seals 148 are O-rings or the apertures 144a and 144b are open with no seal structures. The piston ring seals 148 control flow of lubricant toward the surface 100 from a radially outboard position. The lubricant communicated through the apertures 144a and 144b lubricates the outer race 76 of the bearing assembly 72. The lubricant moves to the apertures 144a and 144b along a path 150 provided between the fixed structure 140 and the bearing support 68.

In this example, the damper beam 64, the bearing support 68, the radial flange 120, and the radial flange 132 are all portions of a single continuous piece. These portions extend circumferentially about the rotational axis A of the engine 20.

The example damper beam 64 tapered. Other damper beams could be tapered, round, etc.

The example bearing assembly 72 is a number 3 bearing of the engine 20. The example bearing assembly 72 rotatably supports the high-speed spool 32 of the engine 20. Other examples may include a bearing assembly 72 that supports the low-speed spool 30, or some other rotating member.

The examples shown utilize a single axial row of damper beams 64 connected to a bearing support with a single radial flange. In other examples, multiple axial sequential rows of damper beams may be used.

Figure 3:
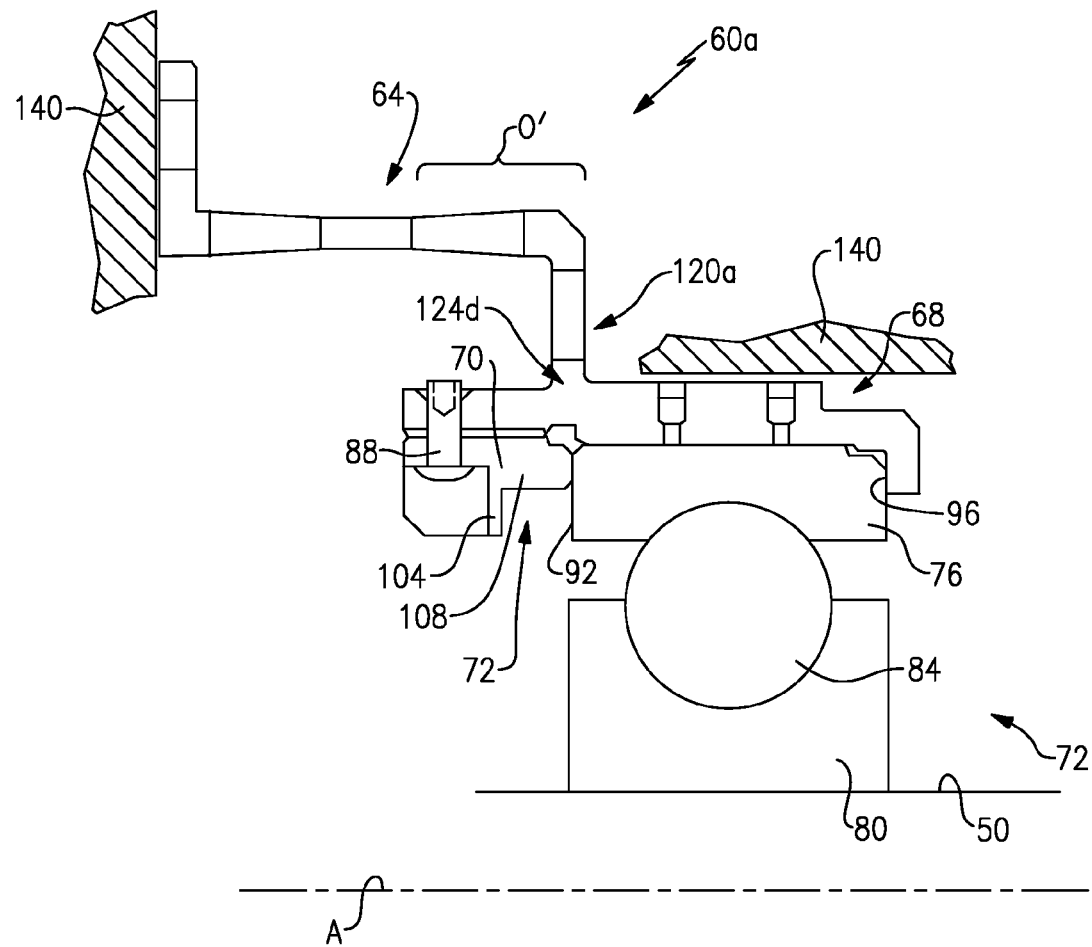
FIG. 3 shows a section view of another example bearing support.

Referring to FIG. 3 with continuing references to FIG. 1, in another example centering spring assembly 60a, a radial flange 120a connecting the bearing support 68 to the damper beam 64 extends in an exclusively radial direction. The radial flange 120a connects to the bearing support 68 at a first axial position 124a. The radial flange 120a connects to the damper beam 64 at the same axial position 124a. The damper beam 64 includes at least a portion that axially overlaps at least a portion of the spanner nut 70. This portion is designated generally as radial overlap O' in FIG. 3.

Features of the disclosed examples include a centering spring having a reduced axial length due to an axially overlapping relationship between a damper beam and bearing support. Another feature is an oil capturing trough positioned near areas benefiting from enhanced lubrication.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A centering spring assembly of a turbomachine, comprising:
   a damper beam;
   a bearing support;
   a connection flange connecting to the bearing support at a first interface and to the damper beam at a second interface;
   a spanner nut having a main body portion; and
   a spanner nut flange structure extending radially from the main body portion toward a rotational axis of the turbomachine to provide an axial boundary of a lubrication trough, the spanner nut flange structure axially overlapping with at least a portion of the connection flange, the spanner nut flange structure axially overlapping with at least a portion of the bearing support, wherein the spanner nut flange structure that provides the axial boundary is axially aligned with the first interface such that no portion of the spanner nut flange structure providing the axial boundary extends axially outside the first interface.

2. The centering spring assembly of claim 1, wherein the spanner nut is configured to directly contact an axially facing surface of a bearing race.

3. The centering spring assembly of claim 1, wherein at least a portion of the first interface is upstream from an axially forwardmost portion of the second interface relative to a direction of flow through the turbomachine such that the connection flange extends along a longitudinal axis having an axial component.

4. The centering spring assembly of claim 1, including a plurality of the damper beam distributed circumferentially about a rotation axis of the turbomachine.

5. The centering spring assembly of claim 1, wherein the connection flange extends along a longitudinal axis having an axial component such that the connection flange is angled relative to a radial direction.

6. A centering spring assembly of a turbomachine, comprising:
   a damper beam;
   a bearing support;
   a radial flange having a first end connected to the bearing support at a first interface, and a second end connected to the damper beam at a second interface that is downstream from the first interface relative to a direction of flow through the turbomachine, the radial flange extending along a longitudinal axis having an axial component;
   a spanner nut, wherein at least a portion of the damper beam axially overlaps at least a portion of the spanner nut relative to a rotational axis of the turbomachine; and a flange structure extending radially from a main body portion of the spanner nut toward the axis to provide an axial boundary of a lubrication trough, wherein the flange structure providing the axial boundary is axially aligned with the first interface such that no portion of the flange structure providing the axial boundary extends axially outside the first interface.

7. The centering spring assembly of claim 6, wherein the damper beam is radially outside the bearing support.

8. The centering spring assembly of claim 6, wherein the radial flange is a first radial flange extending from a first end of the damper beam, and a second radial flange extends from a second end of the damper beam, the first end opposite the second end.

9. The centering spring assembly of claim 8, wherein the first and second radial flange extend from the damper beam in opposite radial directions.

10. The centering spring assembly of claim 6, wherein the bearing support and the damper beam are portions of a single continuous piece.

11. The centering spring assembly of claim 6, including a bearing race that is radially supported by the bearing support, and axially supported by the spanner nut.

12. The centering spring assembly of claim 6, including an outer race of a ball bearing assembly support, the outer race supported by the bearing support.

13. The centering spring assembly of claim 6, wherein at least a portion of the radial flange axially overlaps at least a portion of the damper beam.

14. A method of supporting a centering spring, comprising:
   damping a centering spring at a position that axially overlaps a bearing support;
   rotatably supporting a turbine shaft with a bearing assembly;
   supporting the bearing assembly with the bearing support, wherein a connection flange connects to a damping member providing the damping to the bearing support, and the position of the damping at least partially axially overlaps an interface between the connection flange and the bearing support; and
   capturing lubricant from the bearing assembly or a bearing compartment using a trough that is defined at an axial end by a flange structure extending radially from a spanner nut toward the axis, wherein the flange structure defining the axial end is axially aligned with the interface such that no portion of the flange structure defining the axial end extends axially outside the interface between the connection flange and the bearing support.

15. The method of claim 14, wherein the damping member providing the damping axially overlaps at least a portion of the spanner nut.

16. The method of claim 14, wherein the connection flange extends along a longitudinal axis having an axial component such that the connection flange is transverse to a radial direction.

* * * * *